United States Patent
Peñaranda et al.

(10) Patent No.: US 6,186,656 B1
(45) Date of Patent: Feb. 13, 2001

(54) PROCESSING TOOL FOR MIXING OR COMMINUTING FOOD MATERIALS

(75) Inventors: Mariano Peñaranda, Barcelona; Josep M. Masip, Sant Cugat del Vallés; Robert Rafols, Sant Fost de Campcentelles; Francesc Carreras, Sant Just Desvern, all of (ES)

(73) Assignee: Braun GmbH, Frankfurt (DE)

(*) Notice: Under 35 U.S.C. 154(b), the term of this patent shall be extended for 0 days.

(21) Appl. No.: 09/464,050

(22) Filed: Dec. 15, 1999

Related U.S. Application Data

(63) Continuation of application No. PCT/EP98/03951, filed on Jun. 29, 1998.

(30) Foreign Application Priority Data

Jul. 9, 1997 (DE) .............................. 197 29 446

(51) Int. Cl.[7] .............................. A47J 43/044; A47J 43/07
(52) U.S. Cl. .............................................. 366/129
(58) Field of Search ................................ 366/129, 130, 366/331, 342, 343; 99/348

(56) References Cited

U.S. PATENT DOCUMENTS

| | | | |
|---|---|---|---|
| 3,117,769 | * 1/1964 | Spingler | 366/129 |
| 3,299,924 | * 1/1967 | Hanschitz | 366/129 |
| 3,333,830 | * 8/1967 | Spingler et al. | 366/129 |
| 4,405,998 | * 9/1983 | Brison | 366/129 |
| 4,850,699 | * 7/1989 | Rebordosa | 366/331 |
| 5,366,286 | * 11/1994 | Ruttimann | 366/331 |
| 5,368,384 | * 11/1994 | Duncan et al. | 366/129 |
| 5,810,472 | * 9/1998 | Penaranda et al. | 366/129 |
| 5,836,684 | * 11/1998 | Safont et al. | 366/129 |
| 5,863,118 | * 1/1999 | Ackels et al. | 366/129 |

FOREIGN PATENT DOCUMENTS

| | | | |
|---|---|---|---|
| 288357 | * 5/1953 | (CH) | 366/129 |
| 1170120 | * 5/1964 | (DE) | 366/129 |
| 1242817 | * 6/1967 | (DE) | 366/331 |
| 1 260 716 | 2/1968 | (DE) . | |
| 43 01 209 A1 | 7/1994 | (DE) . | |
| 44 36 092 C1 | 11/1995 | (DE) . | |
| 0 529 287 A2 | 3/1993 | (EP) . | |
| 1.117.914 | 3/1956 | (FR) . | |
| 1467108 | * 12/1966 | (FR) | 366/129 |
| 2213399 | * 8/1989 | (GB) | 366/129 |

* cited by examiner

Primary Examiner—Charles E. Cooley
(74) Attorney, Agent, or Firm—Fish & Richardson P.C.

(57) ABSTRACT

The art knows of a processing tool for mixing or comminuting food materials, with a working shaft (4) which is carried in a shaft housing (2) in the area of its input end and is adapted to be coupled to a drive motor of a kitchen appliance. In the area of its output end, the shaft (4) is centrally carried in a bearing sleeve (7) and fixed in an axial direction and has fastened to its output end a work performing element (6), said shaft housing (2) merging in the area of the output end of the shaft (4) into a flared bell-shaped housing (3) whose inner space is separated from the inner space of the shaft housing (2) by a cover plate (18) through which the shaft output end extends outwardly by passing through a bore (24). The bearing sleeve (7) is inserted and held in an axial direction in a supporting member (8) which bears against the cover plate (18) on the side pointing towards the interior of the shaft housing (2) and overlaps axially with an extension (17) of the cover plate (18). For easy, rapid and accurate assembly, the supporting member (8) is firmly connected with the extension (17) of the cover plate (18) by means of locking members (19), and the cover plate (18), the supporting member (8) and the bearing sleeve (7) are mounted on the working shaft (4) to form a subassembly that is removeable from the processing tool as a unit.

16 Claims, 3 Drawing Sheets

PROCESSING TOOL FOR MIXING OR COMMINUTING FOOD MATERIALS

This is a continuation of PCT application serial number PCT/EP98/03951, filed Jun. 29, 1998, which claims priority from German application serial number 197 29 446.4, filed Jul. 9, 1997.

BACKGROUND

This invention relates to a processing tool for mixing or comminuting food materials.

A processing tool of this type as it is also known from DE 44 36 092 C1 possesses an elongate, tubular housing portion in which a drive shaft is guided in a spaced relationship to the walls and to the lower area of which a bell-shaped housing is integrally formed in which a cutter blade is rotatably fastened to the end of the drive shaft. A cover plate closes the bell-shaped housing in the direction to the tubular housing portion. A circumferential sealing member on the edge of the cover plate seals the cover plate relative to the housing wall. The purpose of this seal is to prevent food materials that are to be processed by the tool as by comminuting, pureeing or blending, from entering the tubular housing portion. The seal is further intended to prevent cleansing water from penetrating into the housing of the tool during cleaning.

On its side remote from the cutter blade, the working shaft is carried in a bearing sleeve which in turn is received in a supporting member. On the one hand, this supporting member bears against the inside of the cover plate or against an annular extension of the cover plate surrounding the working shaft, while on the other hand it takes support upon the inside of the housing in the transition area between the tubular housing portion and the bell-shaped housing. The supporting member further comprises a bell-shaped sealing element terminating at its edge in the annular sealing member sealing the cover plate from the bell-shaped housing.

For assembly of the processing tool of the type referred to in the foregoing, first the bearing sleeve is slipped over the working shaft and fixed by its ends to the working shaft in an axial direction by means of circlips. Then the supporting member is fitted to the bearing sleeve, wedging itself on the bearing sleeve. This subassembly is then inserted into the housing, the supporting member sliding into the tubular shaft housing in addition to engaging into stud-type extensions of the shaft housing. Finally, a shaft seal is fitted over the end of the working shaft, sealing the working shaft from the supporting member and the cover plate. As a final part, the cover plate is seated in place, which on its inside has a tubular extension with locking members making also locking engagement with the stud-type extensions of the shaft housing. With its inside, the cover plate urges against the shaft seal, while urging with its edge against the annular seal of the supporting member to obtain a tight seal. Finally, the working part which is, for example, a cutter blade, is screw threaded to the end of the shaft.

As becomes apparent from the above explanation of the assembly operation, several steps are required to assemble the processing tool, comprising the steps of carrying the working shaft in the housing, sealing the bell-shaped housing from the shaft housing by means of the cover plate, and finally securing the processing tool, these parts being assembled in the housing in consecutive sequence.

SUMMARY

It is an object of the present invention to configure the processing tool for an immersion blender in such fashion that the assembly process as explained in the foregoing with reference to the conventional immersion blender known from DE 44 36 092 C1 is simplified and facilitated. At the same time the invention aims to enable the use of less intricate components while a bearing of equally good or even improved quality is obtained.

The foregoing object is attained in the following way. First the supporting member is fitted to the extension of the cover plate and locked thereon by means of the locking members. Then the bearing sleeve is inserted. The individual parts are configured for interfitting engagement and firm connection with each other. Finally, the end of the working shaft is introduced into the bearing sleeve of this unit and the working shaft is secured thereto. Finally then, the processing tool which is, for example, a cutter blade, is mounted on the end of the working shaft. This subassembly forms a preassembled unit that is inserted in the bell-shaped housing in a final assembly operation. Considering that the individual parts, that is, the supporting member, the cover plate, the bearing sleeve and the working shaft are mounted outside the housing in a prior operation, these parts are readily accessible, ensuring a safe seat which can be inspected prior to final assembly in the housing. Also a materially simplified bearing structure results.

Preferably, the supporting member is constructed of two essentially tubular sections of different diameters having a shoulder surface in the area of transition between the two tubular sections. This shoulder surface provides a simple possibility for locking engagement of the locking members associated with the cover plate. Such a locking engagement may be accomplished by means of openings in the shoulder surface through which such locking members extend. Locking members of the type referred to in the foregoing may be formed by studs having hook-shaped ends arranged to extend through openings in the shoulder surface to hook onto the edge of the opening.

To accomplish a secure hold and distribute the forces uniformly on the circumference of the supporting member and/or the extension of the cover plate, four locking members are preferably provided.

With the arrangement of the present invention it is sufficient for the centering and bearing of the working shaft to be performed in the housing by means of the cover plate. This means that the working shaft is carried in the lower section of the shaft housing without the provision of any further support on the shaft housing.

To accomplish a good seal and a secure hold of the cover plate in the bell-shaped housing and hence also a secure fastening of the subassembly in the housing, the cover plate preferably has its edge adhesively bonded or welded to the inner surface of the bell-shaped housing. If a welding process is employed, this is performed, for example, by ultrasonic welding or similar welding methods in order to obtain an intimate connection between the cover plate and the housing.

The construction of the cover plate with its extension and the construction of the supporting member with the lower tubular section afford the possibility of inserting a radial packing ring, which seals the cover plate from the working shaft in the area of the bore through which the working shaft is passed. This radial packing ring is at the same time wedged between these parts when these are connected or lockingly engaged with each other as indicated in the foregoing.

To secure the bearing sleeve against an axial displacement in the supporting member, the bearing sleeve is preferably provided with a collar taking support upon a correspondingly configured bearing surface of the supporting member. It is desirable that this collar be arranged to extend radially to the working shaft.

To provide for an additional securing of the bearing sleeve, provision may be made for detent elements which retain the bearing sleeve in a fixed position in the supporting member. Such detent elements are preferably provided on the supporting member and, configured as hook-shaped parts embrace the end surface of the bearing sleeve.

For accurate positioning of the working shaft in its proper location relative to the bearing sleeve before the unit comprising the cover plate, the supporting member and the bearing sleeve is assembled in the housing, the bearing sleeve and the working shaft are fixed by a torus seated on the working shaft. Such a torus is preferably formed by a circlip that is clipped onto the working shaft in the area of a corresponding groove (claim 16).

BRIEF DESCRIPTION OF THE DRAWING

Further details and features of the processing tool of the present invention will become apparent from the subsequent description of embodiments illustrated in the accompanying drawings. In the drawings.

DETAILED DESCRIPTION

Figure 1:
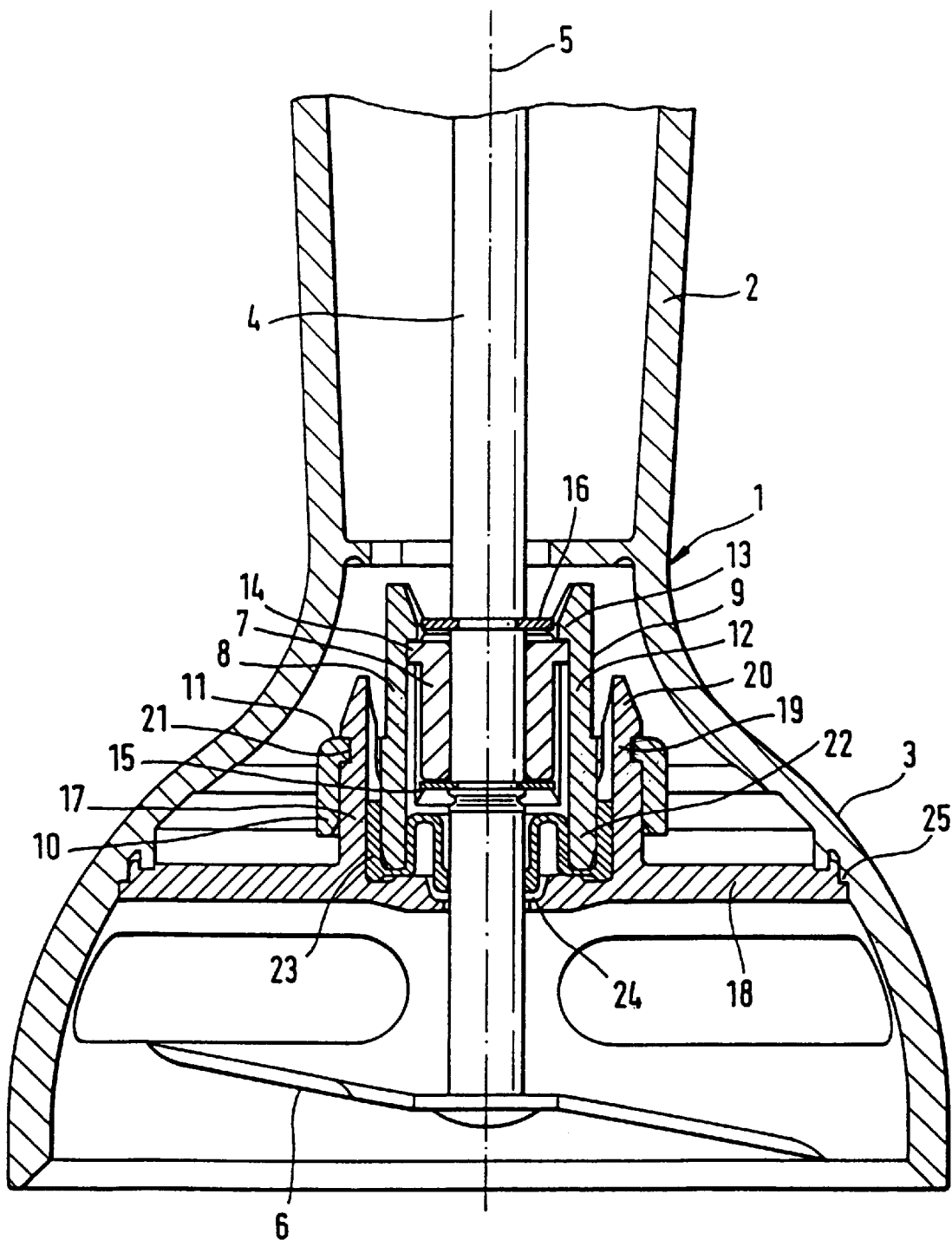
FIG. 1 is a sectional view of a processing tool in the form of an immersion blender in the area of the lower end of the shaft housing and the contiguous bell-shaped housing according to a first embodiment.

The processing tool of the type illustrated in the sectional view of its lower end of FIG. 1 includes a housing 1 having a tubular shaft housing 2 and a contiguous flared bellshaped housing 3. A working shaft 4 is guided in the housing 1 in such fashion that the shaft axis 5 is located centrally within the tubular shaft housing 2 and the bell-shaped housing 3.

The working shaft 4 which carries a cutter blade 6 at its output end is guided in a bearing sleeve 7 which in turn is received in a supporting member 8. The supporting member 8 comprises an upper section 9 associated with the input end of the working shaft 4, and a lower tubular section 10 of a diameter greater than that of the upper section 9. Formed in the transition area between the upper section 9 and the lower section 10 is a shoulder surface 11 extending radially to the axis 5 of the working shaft 4. The upper section 9 possesses two opposite detent members 12 having at their respective free ends hook-shaped parts 13 which point inwardly, that is, towards the axis 5 of the working shaft 4, and embrace a collar 14 that protrudes outwardly beyond the outer circumference of the bearing sleeve 7, thereby securing the bearing sleeve 7 against axial displacement. The individual parts are shown in a perspective view in FIGS. 2 and 3.

As becomes further apparent from FIG. 1, the bearing sleeve 7 is secured against axial displacement on the working shaft 4 by a lower circlip 15 resident within a groove of the working shaft 4, and by an upper circlip 16 correspondingly clipped into a groove of the working shaft 4, the circlips engaging the lower and, respectively, the upper end of the bearing sleeve 7.

Figure 2:
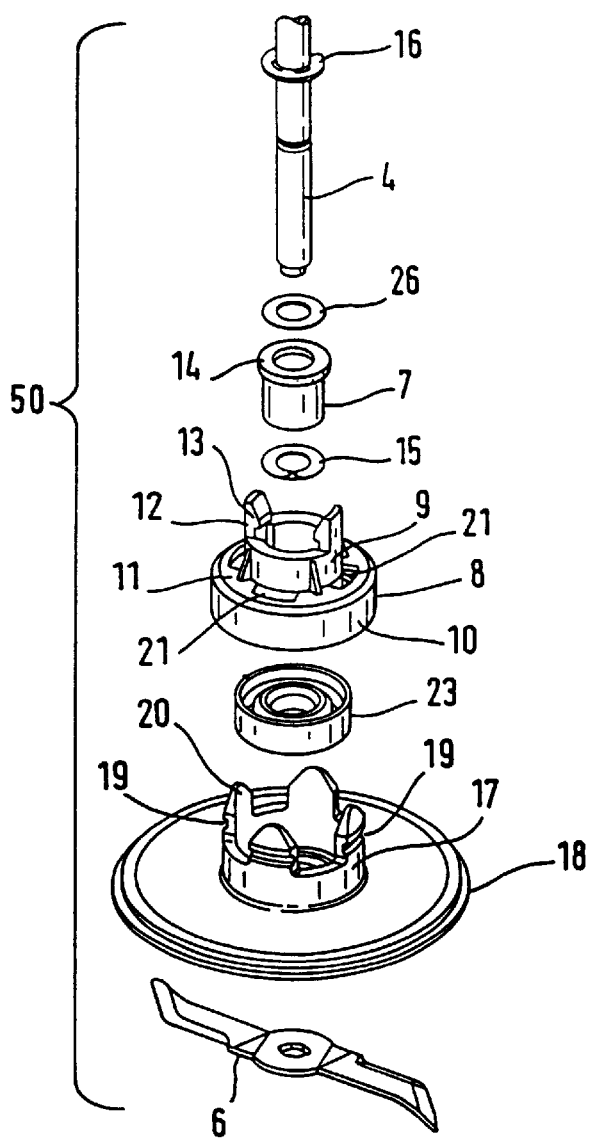
FIG. 2 is an exploded view of the subassembly inserted in the bell-shaped housing of FIG. 1.
Figure 3:
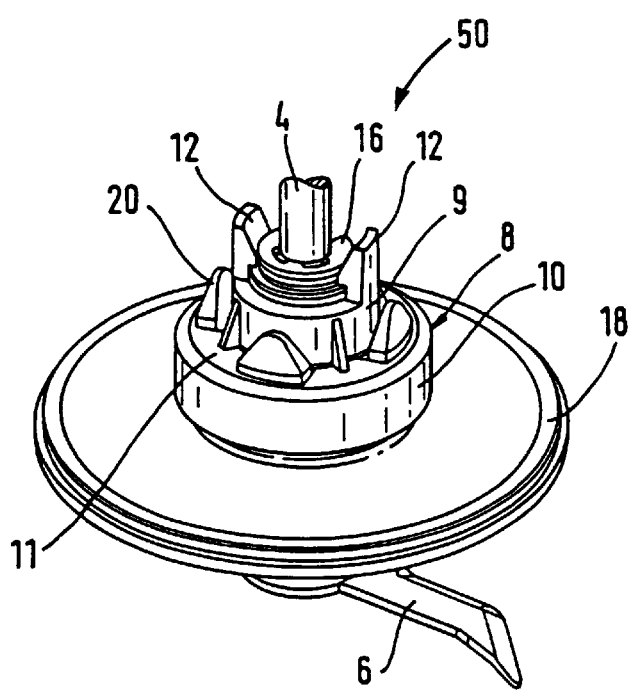
FIG. 3 is a view of the arrangement of FIG. 2 in assembled condition, ready for insertion into a housing.

The supporting member 8 in turn is held on a tubular extension 17 extending from the output end of a cover plate 18 as becomes also apparent from FIGS. 2 and 3. The cover plate 18 serves to seal the bell-shaped housing 3 from the shaft housing 2. The tubular extension 17 comprises four locking members 19 having hook-shaped ends 20. The tubular extension 17 and the hook-shaped ends 20 contiguous thereto are dimensioned such as to engage with the inner surface of the lower section 10. The hook-shaped ends 20 extend through openings 21 for locking engagement with the upper side of the shoulder surface 11 so that the supporting member 8 and the cover plate 18, that is, its tubular extension 17, are firmly connected with each other.

As becomes apparent from FIG. 1, the section 9 of the supporting member 8 is extended towards the output end of the working shaft 4 or to the cover plate 18, so that this extended portion 22 overlaps with the tubular extension 17. The extended portion 22 reaches approximately up to the cover plate 18, and a radial packing ring 23 is wedged between this extended portion 22 and the tubular extension 17, thereby sealing the cover plate 18 and the working shaft 4 in the area of a bore 24. The bearing arrangement of the working shaft 4 by means of the cover plate 18, the supporting member 8 and the bearing sleeve 7 as described in the foregoing and illustrated in detail in FIG. 2 may be pre-assembled as a unit as shown in FIG. 3.

For this purpose, first the cover plate with its tubular extension 17 is made available, and the radial packing ring 23 is inserted into the tubular extension 17. Subsequently, as FIGS. 2 and 3 show, the supporting member 8 is slipped with its lower section 10 over the tubular extension 17 of the cover plate 18 so that the four hook-shaped ends 20 of the locking members 19 are introduced into the four openings 21 in the shoulder surface 11. Finally, the bearing sleeve 7 is installed on the working shaft 4, abutting the upper circlip 16, and is secured with a lower circlip 15 against axial displacement on the working shaft 4. Where necessary, washers 26 may be placed in-between. The working shaft 4 with the bearing sleeve 7 installed thereon is then inserted in the central opening of the upper section 9 of the supporting member 8 until the collar 14 of the bearing sleeve 7 engages the chamfered end surfaces of the detent members 12. With the bearing sleeve 7 continuing to be inserted in the upper section 9, the detent members 12 are urged apart until the collar 14 is in locking engagement with the hook-shaped parts 13. In a final operation, the cutter blade 6 is fitted to the end of the working shaft 4, resulting in the preassembled unit 50 according to FIG. 3. This preassembled arrangement is inserted in the housing 1 from the open end of the bell-shaped housing 3 and located centrally by means of the cover plate 18.

Figure 4:
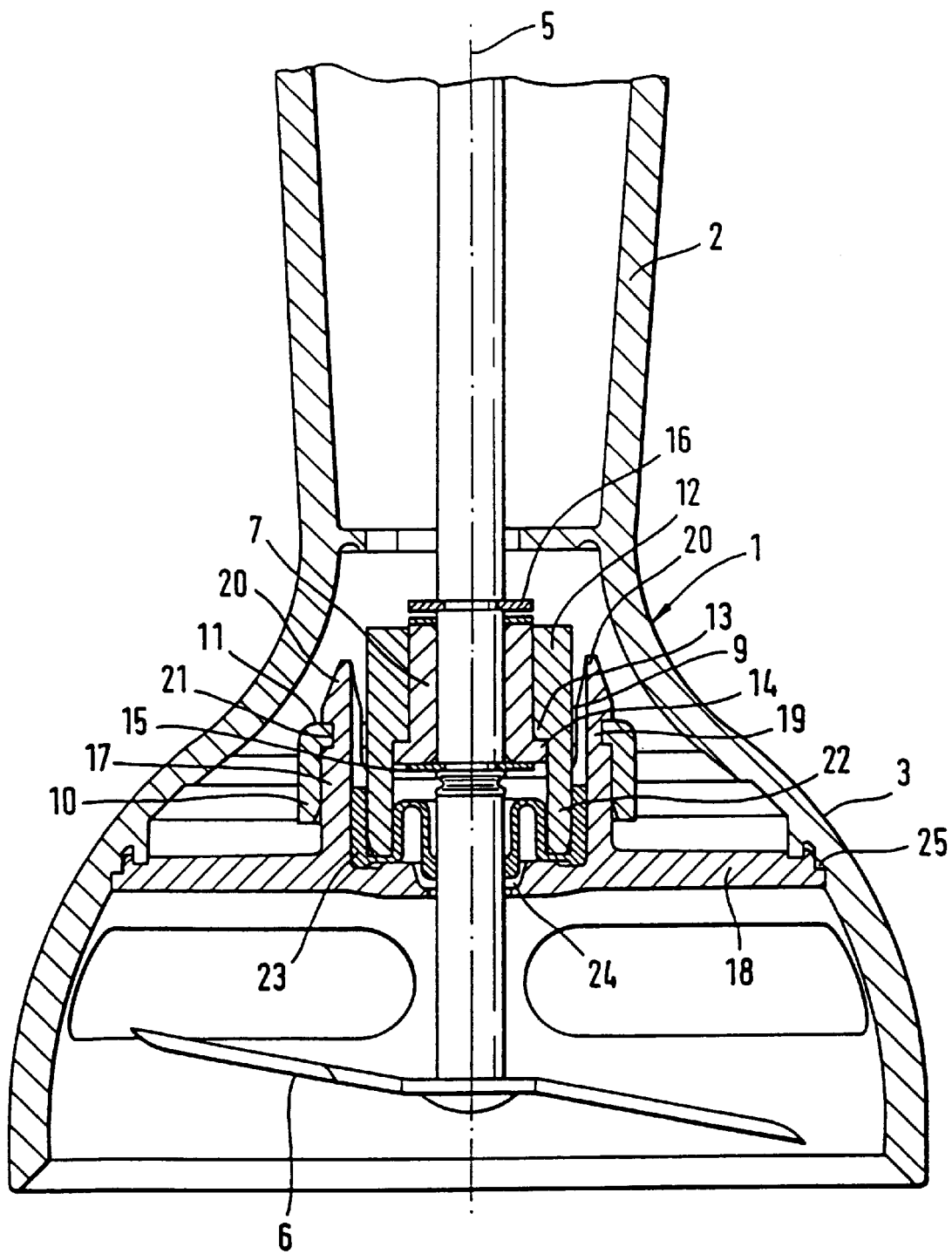
FIG. 4 is a sectional view as in FIG. 1, but illustrating a second embodiment of a processing tool.

FIG. 4 shows a further embodiment of a processing tool in a sectional view which corresponds to the sectional view of FIG. 1 and is identical to the embodiment of FIG. 1 as regards its essential components. Therefore, the same reference characters are applied to identical or comparable parts as those disclosed in the embodiment of FIG. 1.

By comparison with the embodiment of FIG. 1, the bearing sleeve 7 and the upper section 9 of the supporting member 8 are modified. While in the embodiment of FIG. 1 the collar 14 is provided at the upper input end of the bearing sleeve 7 and is embraced by the hook-shaped parts 13 to be thereby retained within the supporting member 8, in the embodiment of FIG. 4 this bearing sleeve 7 is turned in such fashion that the collar 14 of the bearing sleeve 7 points towards the output end of the working shaft 4 carrying the cutter blade 6. To fix the bearing sleeve 7 in place, the hook-shaped parts 13 are relocated farther towards the center of the upper section 9 of the supporting member 8 as seen in an axial direction, so that they take support upon the collar 14.

What is claimed is:

1. A processing tool for mixing or comminuting food materials, comprising:

a working shaft having an input end that is adapted to be coupled to a drive motor of a kitchen appliance and an output end that is fixed and centered in an axial direction;

a bearing sleeve for carrying the output end of the working shaft;

a work performing element fastened to the output end;

a shaft housing carrying the working shaft, the shaft housing defining an inner space;

a flared bell-shaped housing attached to the shaft housing in the area of the output end of the working shaft, the bell-shaped housing defining an inner space a cover plate separating the inner space of the shaft housing from the inner space of the flared bell-shaped housing, the cover plate having:
  a bore through which the shaft output end extends outwardly, and
  an extension:

a supporting member in which the bearing sleeve is inserted and held in the axial direction, the supporting member bearing against the cover plate on the side pointing towards the interior of the shaft housing and overlapping axially with an extension of the cover plate; and locking members firmly connecting the supporting member with the extension of the cover plate;

wherein the cover plate, the supporting member and the bearing sleeve, are mounted on the working shaft to form a subassembly that is removeable from the processing tool as a unit.

2. The processing tool as claimed in claim 1, wherein the supporting member includes:

a lower tubular section close to the cover plate an upper tubular section adjacent to the bearing sleeve, and a shoulder surface extending approximately radially from the lower tubular section towards an axis defined by the working shaft, into the upper tubular section, the extension of the cover plate being in locking engagement with said shoulder surface.

3. The processing tool as claimed in claim 2, wherein the shoulder surface has at least two openings through which the locking members extend.

4. The processing tool as claimed in claim 2, wherein a radial packing ring is arranged between the extension of the cover plate and the lower tubular section of the supporting member to provide a seal against the cover plate in the area of the bore.

5. The as claimed in claim 1, wherein the locking members formed by respective studs having a hook-shaped end.

6. The processing tool as claimed in claim 1, having four locking members which are affixed to the extension of the cover plate, the four locking members being uniformly spaced on a circumference of the extension of the cover plate.

7. The processing tool as claimed in claim 1, wherein the centering and bearing of the working shaft in the lower section of the shaft housing and the bell-shaped housing is performed by means of the cover plate.

8. The processing tool as claimed in claim 1, wherein the cover plate has its edge adhesively bonded or welded to the inner surface of the bell-shaped housing.

9. The processing tool as claimed in claim 1, wherein the bearing sleeve includes a collar taking support in an axial direction upon a bearing surface of the supporting member.

10. The processing tool as claimed in claim 9, wherein the collar is arranged to extend radially to the working shaft.

11. The processing tool as claimed in claim 1, wherein the bearing sleeve is retained in the supporting member by means of detent elements.

12. The processing tool as claimed in claim 11, wherein the detent elements are provided on the supporting member.

13. The processing tool as claimed in claim 11, wherein the detent elements are hook-shaped parts embracing the end surface of the bearing sleeve.

14. The processing tool as claimed in claim 1, wherein the bearing sleeve has its input end fixedly held against axial displacement by a circlip mounted on the working shaft.

15. The processing tool as claimed in claim 1, wherein the bearing sleeve has its output end fixedly held against axial displacement by a torus formed on the working shaft and protruding beyond the circumference of the working shaft.

16. The processing tool as claimed in claim 15, wherein the torus is formed by a circlip.

* * * * *